Dec. 15, 1931.   C. HARRIS   1,837,160
BALL AND SOCKET JOINT
Filed July 24, 1929
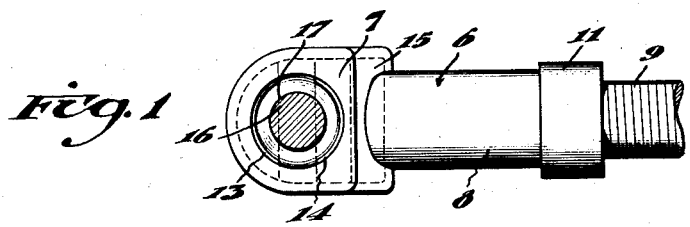
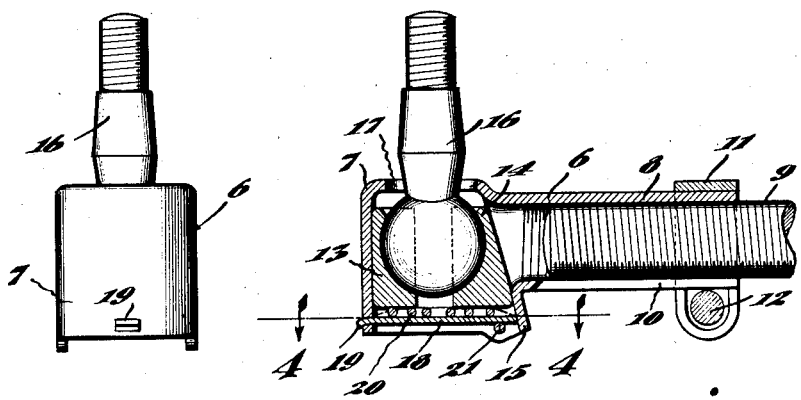
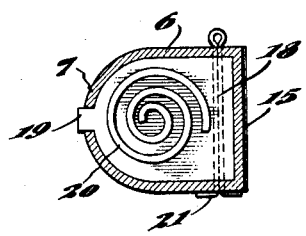
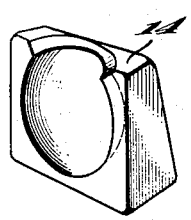
INVENTOR
Cleo. Harris
BY
Wood & Wood   ATTORNEYS Patented Dec. 15, 1931

1,837,160

UNITED STATES PATENT OFFICE

CLEO HARRIS, OF CINCINNATI, OHIO, ASSIGNOR TO THE CINCINNATI BALL CRANK COMPANY, OF CINCINNATI, OHIO, A CORPORATION OF OHIO

BALL AND SOCKET JOINT

Application filed July 24, 1929. Serial No. 380,604.

This invention relates to improvements in ball and socket connections or joints incorporated at the ends of radius rods, connecting rods, steering reach rods, drag links, etc., and is particularly directed to the mounting and form of the bearing seats and the assembly maintenance and wear compensating means embodied in the joint.

These ball and socket joints are usually placed in a moving environment, such as an automobile, and are therefore subject to constant bearing, vibration and shocks, causing wear in addition to that caused by movement of the ball in the socket due to the normal functioning of the joint. It is extremely important that the joints be kept snug in the ball and socket and in close contact, not only for evenly distributing the wear and noiseless function, but for safety as well. Any tendency for the ball to play in the socket creates a clearance conducive to shocks and pounding on the seats, crystallizing the metal and unevenly wearing the bearing surfaces, and eventually resulting in breakage and disconnection.

An object of this invention is to provide an improved ball and socket connection or joint incorporating an automatic wear compensating device therein.

Another object is to provide a ball and socket joint fabricated of a minimum number of parts which are assembled in an efficient and facile manner, and the ball arranged within the socket so as to be incapable of disassembly therefrom in the event of breakage of the bearing seats.

Another object is to provide a wear compensating means which is sensitive to vibration and shock and as a consequence is extremely effective in the environment of a moving vehicle where the concussions, normally detrimental, are put to use for increasing the contact of the ball and socket.

Another object is to arrange the bearing seats within the socket and the wear compensating device so that the take-up is uniform and the pressure properly directed to cause the wearing down of the ball and seats to take place evenly.

Further objects and advantages will be more fully set forth in the description of the accompanying drawings, in which:

Figure 1 is a view of the ball and socket joint taken through the ball arm or stud and looking toward that side of the joint.

Figure 2 is a sectional view taken on line 2—2, Figure 1, completely depicting the arrangement of the various parts of the joint.

Figure 3 is an end view of the ball and socket joint.

Figure 4 is a sectional view taken on line 4—4, Figure 2, illustrating the closure and spring retaining means for the socket.

Figure 5 is a perspective view of the wear compensating bearing block.

Describing the device of the present invention in general, it comprises a socket casing attached on the end of a rod, a ball arm having the ball end disposed within the socket, and bearing blocks surrounding the ball and urged thereagainst by means of a spring retained in position by a retainer plate secured across the open side of the casing. The bearing blocks are urged inwardly into the socket by means of the spring, one of the blocks having an inclined surface engaging an inclined wall of the casing whereby the block acts as a wedge and imparts pressure toward the center of the ball.

Referring to the drawings in detail, the parts are designated and arranged as follows: The socket casing 6 is of integral structure and provides a socket portion 7 and a sleeve portion 8, the sleeve portion extending laterally and at right angles from the socket portion. The casing is adjustably connected to the end of the rod 9 by means of cooperating screw threads formed on the end of the rod and the interior of the sleeve respectively. The sleeve portion is longitudinally split as at 10 and a clamping ring 11 encircles the outer end of the sleeve and is tightened by means of a draw bolt 12 for clamping the sleeve to the rod and locking the casing in set position relative to the rod.

The bearing blocks are indicated at 13 and 14 respectively. The wall 15 of the socket, from which the attaching sleeve extends, is inclined, and the bearing block 14 has its outer surface correspondingly inclined, whereas the other block engages a straight wall of the casing parallel with the ball arm 16 and concentric therewith.

The ball arm or stud 16 is inserted through the large end of the socket, with the arm portion thereof traversing an aperture 17 in the base of the socket, this aperture being insufficient in size to permit the passage therethrough of the ball. At the time the ball arm is slid into position, the blocks are disposed thereabout and the assembled ball arm and blocks are inserted as a unit.

A plate 18 having a tongue 19 traversing a slot in the straight wall of the socket casing covers the large open end of the casing and compresses a tapered coil spring 20 against the respective bearing blocks. The coil spring is of sufficient diameter to engage both blocks, and the outer end of the plate, or the end opposite to the end having the tongue thereon, is secured in position by means of a cotter pin 21 traversing the side walls of the socket casing. It will readily be apparent that the assembly of the joint is facilitated by the foregoing arrangement, and the device rapidly fabricated when it is necessary to insert new parts.

The coil spring acts to force the blocks downwardly into the base of the socket. The block 14 moving against the inclined surface acts as a wedge and the force is directed from the inclined surface toward the center of the ball, this force tending also to maintain the ball against the straight bearing on the opposite side.

Thus, the bearing blocks are constantly urged evenly and uniformly against the ball, and as any play or clearance is created by wear it is immediately compensated for by the movement of the bearing blocks. The block 14 because of its movement on the inclined surface imparts the ball contact pressure from that surface rather than being influenced in its ultimate action by the exact direction of thrust primarily imparted by the spring, and the result is that there is the same pressure toward the longitudinal axis of the ball arm at the ball at all points along the wedge surface. It will be apparent that the vibration of the parts is partly instrumental in firmly seating the bearing blocks about the ball.

The inclined surface is relatively slightly nonparallel from the center line of the socket and ball arm, and for this reason any thrusts inserted from the arm into the bearing blocks have little tendency to displace the blocks outwardly from their spring urged position.

The slight tendency to slide back on the inclined surface is amply taken care of by the force of the spring, so that when once seated in a new or advanced position, the blocks are never subject to back play and the tight condition of the joint is always maintained. The ball arm or stud is attached to any actuating or actuated device such as a shock absorber or steering rod.

Having described my invention, I claim:

1. A ball and socket connection, comprising, a socket casing having an open end, an arm having a ball on the end thereof, said ball disposed within the casing, said casing having an aperture in the end opposite to the open end thereof through which aperture said arm extends, bearing blocks surrounding said ball, said casing having an opening in the wall thereof, a plate covering the open end of the casing, and having a lug at one end engaged in the opening in the wall of the casing, a cross pin traversing the wall of the casing and engaging across the other end of the plate, and a spring compressed between the plate and the bearing blocks.

2. A ball and socket connection, comprising, a socket casing having an open end, an arm having a ball on the end thereof, said ball disposed within the casing, said casing having an aperture in the end opposite to the open end thereof through which said arm extends, bearing blocks surrounding said ball, said bearing blocks engaging the walls of the socket casing, said walls disposed angularly relative to each other, a plate covering the open end of the casing, a spring between said plate and said bearing blocks for urging the same into the angle of intersection of said walls, said casing having an aperture therein toward its open end, said plate having a lug engaged in said aperture, and a cross pin traversing the wall of the casing and engaged across the other end of the plate.

3. In a ball and socket joint, a socket casing having an open end, one wall portion of said socket casing disposed at right angles to said open end and the other wall portion disposed at an angle to said first mentioned wall portion, bearing seats slidably mounted on the respective wall portions for engaging a ball therebetween, a spring for urging said bearing seats toward the angle of intersection of said wall portions, and a closure plate secured in the open end of said socket for maintaining the spring against said bearing seats.

In witness whereof, I hereunto subscribe my name.

CLEO HARRIS.